May 28, 1946. T. J. LEHANE ET AL 2,401,004
FLUID PRESSURE ACTUATED MODULATING CONTROL MEANS
Filed Aug. 7, 1942
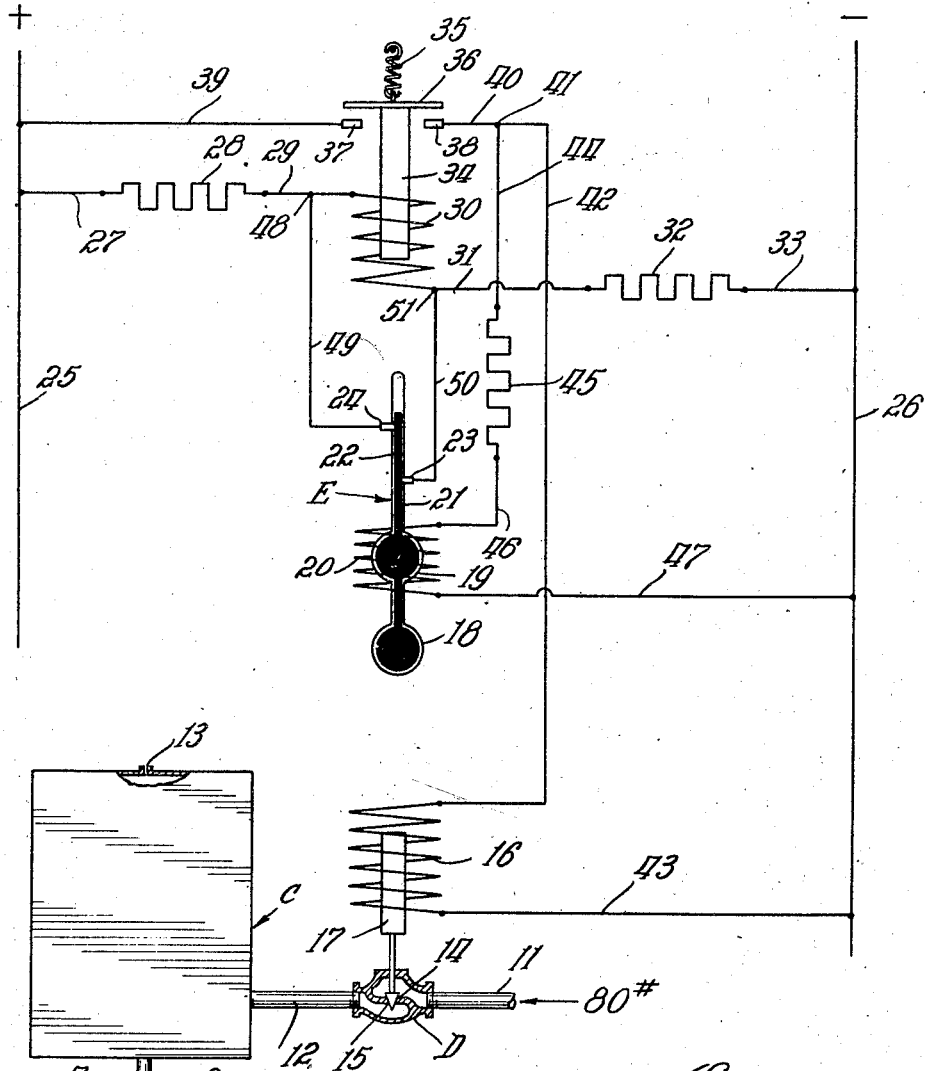
Inventors:
Timothy J. Lehane &
Joseph E. LaRocque
By Barnett & Truman Attys Patented May 28, 1946

2,401,004

UNITED STATES PATENT OFFICE 2,401,004

FLUID PRESSURE ACTUATED MODULATING CONTROL MEANS

Timothy J. Lehane and Joseph E. La Rocque, Chicago, Ill., assignors to Vapor Car Heating Company, Inc., Chicago, Ill., a corporation of New York Application August 7, 1942, Serial No. 453,920

2 Claims. (Cl. 236—68)

This invention relates to certain new and useful improvements in apparatus for modulating or adjusting the supply of heating medium, or otherwise adjusting air-conditioning apparatus in accordance with variations from a predetermined temperature in the space being controlled, more particularly to such an apparatus including a fluid-pressure actuated motor means together with thermostatically controlled apparatus for modulating the pressure of the actuating air or other fluid.

In apparatus of this type as hitherto proposed, the control valve or damper has been adjusted or modulated directly from the thermostat or through interposed electrically actuated apparatus or a "heat-motor" adapted to supply the required power. According to the present invention a fluid-pressure motor for adjusting the valve is supplied with air or other fluid from a substantially constant source of pressure through an intermittently operated valve controlled by the thermostat whereby the air-pressure actually delivered to the motor is cut down or modulated in proportion to the variation of temperature in the control space.

The accompanying drawing is a partial elevation and partial section showing the principal elements diagrammatically in connection with a suitable wiring diagram.

At 1 is indicated a conduit through which a suitable heating medium (for example heated air) is conveyed to the space to be heated. The flow of this medium is controlled by a damper or valve A centrally pivoted at 2 and operated through a crank 3 and link 4 from a rod or plunger 5 actuated by the motor B. It is to be understood that any suitable type of valve could be controlled from the motor B through these connections, for example a valve which controls the flow of fuel to a burner or heater. This valve or damper is preferably of the type that can be operated from a fully closed position, as shown at A, to an open or partially open position, as shown at A' so that the flow of heating medium can be either cut off or adjusted or modulated.

This valve is adjusted by means of a motor B actuated by air pressure (or other suitable pressure fluid). This motor is here shown as being of the bellows type connected through a small supply pipe 7 with a storage tank C, the upper fixed end plate 6 of the motor being connected through a corrugated bellows diaphragm 8 with the lower movable end plate 9 from which depends the operating plunger 5. When air is delivered into the motor B through pipe 7 the bellows will expand against the resistance of spring 10 and partially open the valve A. The spring 10 is coiled around the plunger 5 and tends to contract the bellows motor and close or partially close the valve when the pressure in the motor is released or lowered. Supply pipe 11 extends from a source of air under substantially constant pressure (for example 80 pounds to the square inch) through an intermittently operated needle valve D and the pipe 12 into the storage tank C. This tank is provided with a small constantly open leakage vent 13 of smaller size than the opening through the valve D. This valve D may comprise a needle valve 14 adapted to fall to closed position in the valve opening 15. This valve is adapted to be lifted to its open position by the solenoid coil 16 surrounding the core 17. The flow of air under pressure into tank C, when the valve D is open, will be considerably greater than the leakage through vent 13 and the pressure in the tank will build up to substantially the pressure of the supply source, for example 80 pounds. This air pressure will extend through pipe 7 into the motor B and thus force the valve A toward open position. On the other hand, when the solenoid coil 16 is de-energized the core 17 will fall so as to close valve D. The pressure in the tank C will now be dissipated by leakage through the leak vent 13 and the spring 10 will act to close the valve A and cut off the heat or to partially close the said valve depending on the amount of air discharged through said leak valve 13.

The thermostat here shown at E is of the mercury-column type comprising a lower bulb 18 which is constantly exposed to the air in the space to be controlled and responds to changes in atmospheric temperature, an upper bulb 19 connected with lower bulb 18 and surrounded by an auxiliary heating coil 20, and the stem 21 rising from bulb 19 and housing the mercury column 22. A lower contact 23 mounted in stem 21 is always in engagement with the mercury column, while an upper contact 24 will only be engaged by the mercury column when the temperature affecting the bulbs rises to a predetermined height, for example that corresponding to a thermostat temperature of 80°.

At 25 and 26 are indicated the power leads from a suitable source of electric power, a current normally flowing from main 25 through wire 27, resistor 28, wire 29, relay coil 30, wire 31, resistor 32 and wire 33 to the negative main 26. As a result the core 34 will be pulled down so as to draw down the contact plate 36 against the resistance of spring 35 and engage the fixed contacts 37 and 38. This will serve to complete a circuit from positive main 25 through wire 39, relay contacts 37, 36 and 38, wire 40, terminal 41 and wire 42 to the solenoid coil 16, thence through wire 43 to the negative main 26. As a result the core 17 will be lifted and the valve D will be opened. At the same time another branch circuit will be completed from terminal 41, through wire 44, resistor 45, wire 46, heating coil 20, and wire 47 to the main 26.

Assuming now that the temperature within the space being controlled rises to or above 80°, the mercury column will rise until it engages the upper thermostat contact 24 (as shown in the drawing) and a branch circuit will be completed so as to short-circuit the relay coil 30 as follows: From the terminal 48 in wire 29, through wire 49, thermostat contact 24, mercury column 22, thermostat contact 23, wire 50 and terminal 51 in the wire 31. As a result the coil 30 will be de-energized and the spring 35 will lift the contact 36 and core 34 so as to break the relay circuits and de-energize the valve solenoid 16 and also the auxiliary heater 20. These are the positions shown in the drawing, the valve D being closed and the auxiliary heater 20 being inoperative. As stated, the atmospheric temperature is sufficiently high to keep the thermostat contact closed without any auxiliary heat, and the valve D will be closed so as to cut off all flow of pressure air. The air pressure will leak from the tank C and the motor B will be collapsed by spring 10 so as to close the heating medium valve or damper A. This position of the parts will continue as long as the temperature remains above 80°.

Assuming now that the space temperature should drop, for example to 79°, the mercury column will break contact at 24 and the relay coil 30 will again be energized to pull down the contact 36 and complete the solenoid circuit through coil 16 so as to lift valve 14 and permit a flow of air under pressure into tank C. This will cause the motor B to partially expand and tend to open the valve A, thus increasing the flow of heat to the space, while at the same time the auxiliary heater 20 will be energized to directly add heat to the thermostat and again return the thermostat temperature to or above 80°. As a result the auxiliary heater will again be cut off and the needle valve D will again be closed. This cycling operation will repeat itself at intervals so that as long as the effective temperature remains at about 79° the air valve D will be open about 25% of the time and closed about 75% of the time so that the air pressure in tank C will be about 20 pounds, that is about 25% of the maximum of 80 pounds. This will be sufficient to cause the motor B to open the valve A partially and cause a slight increase in the heat delivered to the space. If this increase in heat should be insufficient and the space temperature should drop further to, for example, 78°, then the cycling operation will be such as to permit a flow of air into the tank C for approximately 50% of the time and the air pressure in the tank will stabilize at approximately 40 pounds. In the same manner the storage tank pressure can be raised to 60 pounds at an atmospheric temperature of 77°, and when the atmospheric temperature falls below 76° the four degrees of heat from auxiliary heater 20 will be insufficient to raise the effective temperature at the thermostat above 80° and the relay 30 will remain energized at all times, thus keeping the valve D open and permitting the pressure in the storage tank to rise to approximately 80 pounds and thus keeping valve or damper A substantially open at all times.

It will thus be seen that the amount of effective air pressure in tank C will be modulated or adjusted in proportion to the fall of space temperature below 80° (or other selected temperature for which the apparatus is designed). In the example hereinabove described the actuating air pressure will be varied between atmospheric pressure and 80 pounds.

It will now be apparent that this apparatus could be adapted to adjust a valve, such as A, for modulating the control of a cooling system, or other air conditioning system, by making suitable changes in the functioning temperatures. For example, the damper or valve A could be normally open and could be closed whenever the temperature at the thermostat E dropped below a predetermined temperature. Or, the valve D could be a normally open valve, and could be closed by the action of solenoid 16. Or the thermostat E could be placed in series with the coil 30, instead of in parallel therewith.

We claim:

1. In a temperature controlling apparatus, means for modulating the rate of supply of heating medium, a fluid-pressure operated motor for adjusting said modulating means towards its closed position as the fluid pressure in said motor is relieved, a source of fluid under predetermined pressure, a storage tank provided with a conduit leading into the motor and a constantly open vent, a supply pipe leading from the source to the tank, an intermittently actuated cut-off valve in said pipe which is opened and closed instantaneously and which when open permits a greater flow into the tank than can leak from the vent, a thermostat, and electrically energized means controlled by the thermostat for determining the proportionate lengths of time that the valve is opened and closed.

2. In a temperature controlling apparatus, means for modulating the rate of supply of heating medium, a fluid-pressure operated motor for adjusting said modulating means toward its closed position as the fluid pressure in said motor decreases, a source of fluid under predetermined pressure, a storage tank provided with a conduit leading into the motor so as to utilize full storage pressure for actuating the motor and provided with a constantly open vent, a supply pipe leading from the source to the tank, an intermittently actuated cut-off valve in said pipe which is opened and closed instantaneously and when open permits a greater flow into the tank than can leak from the vent, a thermostat, electrically energized means controlled by the thermostat for operating the valve, and an auxiliary heating means for the thermostat and connected in parallel therewith, and means effective to close an energizing circuit through said auxiliary heating means when the thermometer calls for heat, whereby the thermostat modulates the valve actuating operation in proportion to the amount of variation from a predetermined temperature at the thermostat.

TIMOTHY J. LEHANE.
JOSEPH E. LA ROCQUE.